United States Patent
Yap et al.

(10) Patent No.: US 6,786,962 B2
(45) Date of Patent: Sep. 7, 2004

(54) EMULSION OF A COLLOIDAL CLAY AND WATER SLURRY IN A BITUMEN CUTBACK

(75) Inventors: Michael L. Yap, Oldsmar, FL (US); Raymond T. Hyer, Tampa, FL (US); Barton J. Malina, Tampa, FL (US)

(73) Assignee: Gardner Asphalt Corporation, Tampa, FL (US)

( * ) Notice: Subject to any disclaimer, the term of this patent is extended or adjusted under 35 U.S.C. 154(b) by 0 days.

(21) Appl. No.: 10/365,879

(22) Filed: Feb. 13, 2003

(65) Prior Publication Data

US 2003/0183127 A1 Oct. 2, 2003

Related U.S. Application Data

(63) Continuation-in-part of application No. 10/113,223, filed on Mar. 29, 2002, which is a continuation-in-part of application No. 09/887,383, filed on Jun. 22, 2001, now Pat. No. 6,616,743.

(51) Int. Cl.[7] ............................................. C09D 195/00
(52) U.S. Cl. ....................................................... 106/277
(58) Field of Search ............................. 106/277; 524/60

(56) References Cited

U.S. PATENT DOCUMENTS

| | | |
|---|---|---|
| 4,056,401 A | 11/1977 | DeBough |
| 4,161,566 A | 7/1979 | Higgins |
| 4,193,815 A | 3/1980 | Burris |
| 4,405,375 A | 9/1983 | Gibson et al. |
| 4,437,896 A | 3/1984 | Partanen |
| 4,657,943 A | 4/1987 | Wietsma |
| 4,907,956 A | 3/1990 | Ezaki et al. |
| 5,224,990 A | 7/1993 | Vicenzi et al. |
| 5,266,538 A | 11/1993 | Knudson et al. |
| 5,340,391 A | 8/1994 | Grzybowski |
| 5,362,314 A | 11/1994 | Vicenzi et al. |
| 5,362,316 A | 11/1994 | Paradise |
| 5,364,894 A | 11/1994 | Portfolio et al. |
| 5,596,032 A | 1/1997 | Schilling et al. |
| 5,658,972 A | 8/1997 | Gryzbowski et al. |
| 5,667,576 A | 9/1997 | Chatterjee et al. |
| 5,711,796 A | 1/1998 | Grzybowski et al. |
| 5,713,996 A | 2/1998 | Morris et al. |
| 5,840,105 A | 11/1998 | Helmstetter |
| 5,970,893 A | 10/1999 | Starita et al. |
| 5,981,632 A | 11/1999 | Fields |
| 6,245,850 B1 | 6/2001 | Fields |
| 6,267,809 B1 | 7/2001 | Boyer et al. |
| 6,451,885 B1 | 9/2002 | Dresin et al. |

FOREIGN PATENT DOCUMENTS

JP  402118931 A  5/1990

*Primary Examiner*—David Brunsman
(74) *Attorney, Agent, or Firm*—Jansson, Shupe & Munger, Ltd.

(57) ABSTRACT

A emulsion for sealants, coatings and/or mastics having reduced volatile organic compounds is disclosed. The emulsion includes a slurry of substantially fully hydrated colloidal clay and a cutback in preferred ratios such that the emulsion has characteristics adapted to cold application processes. A method of reducing volatile organic compounds in sealants, coatings and/or mastics is also disclosed.

19 Claims, No Drawings

EMULSION OF A COLLOIDAL CLAY AND WATER SLURRY IN A BITUMEN CUTBACK

RELATED APPLICATIONS

This application is a continuation-in-part of pending application Ser. No. 10/113,223, filed Mar. 29, 2002, which, in turn is a continuation-in-part of pending application Ser. No. 09/887,383, filed Jun. 22, 2001 now U.S. Pat. No. 6,616,743, Sep. 9, 2003. The disclosures of each pending application are incorporated herein by reference.

FIELD OF THE INVENTION

This invention relates generally to the field of sealants, coatings and mastics, and, more particularly to the use of emulsions as sealants, coatings and mastics for cold applications.

BACKGROUND OF THE INVENTION

The use of bitumens and/or blends thereof for sealant, coating and mastic applications is well known. Bitumens are mixtures of heavy hydrocarbons, essentially naphthenic and paraffinic, originating from the distillation of crude oils. These products are distillation residues and are classified by their physical properties, their chemical properties varying very widely as a function of the origins of the crude. Generally speaking, conventional crudes contain up to 30% bitumen, and heavy crudes up to 50%. As bitumen requirements of the majority of countries represent 2 to 4% of their crude oil consumption, this means that bitumen is available in very plentiful supply. Bitumens contain such a diversity of constituents that it is impossible to define their exact composition; nevertheless, it is possible to classify these constituents into major chemical families:

saturated compounds, essentially paraffinic;

aromatic compounds, in which 30% of the carbon atoms are included in aromatic cycles, with a sulphur content of around 2 to 3%;

asphaltenes, which are insoluble in hydrocarbons, are aromatic and rich in sulphur, nitrogen, and oxygen; they take the form of black brittle solids practically incapable of being melted.

For given bitumens, the percentage of these various families depends heavily on the extraction method used. Thus, products of this type are essentially classified by the following physical properties: penetrability (NFT 66-004), softening point (NFT 66-008), density (NFT 66-007), flashpoint (NFT 60-118), solubility (NFT 66-012) ductility (NFT 66-006), brittleness point. Commercially available bitumens, classified by penetrability index, are generally situated between 10 and 200.

Such bitumens and/or blends can be applied to surfaces using "hot application" or "cold application" methods. In hot applications, the composition is heated, typically to temperatures well over 100° F., in order to decrease viscosity of the composition to facilitate application to the intended surface. Such heating requires special equipment and experienced personnel. Obviously, it is desirable to avoid working with a hot material at a job site, which may be a roof top, roadway, or similar surface, thus there has been a trend toward cold application compositions.

Various technologies have been developed to provide for cold application. They involve placing the bitumen in a fluid media, or vehicle, allowing for application without requiring heating. After application, the bitumen solidifies or cures through the elimination, in most cases by evaporation, of the vehicle. The two most common vehicles are solvents and water.

When using a solvent as the vehicle, the bitumen must be soluble in the solvent. Most often, the solvent is a petroleum distillate. Petroleum distillates produce blends that are commonly referred to as cutbacks or road oils. They vary in viscosity and cure rate depending on the type of base bitumen, type of solvent, and composition.

In such cutbacks, bitumens of differing physical characteristics may be blended to offer improved performance characteristics, e.g., elongation, recovery, and weatherability. Organic and inorganic fillers may be utilized to provide reinforcement and resistance to flow. The introduction of elastomers may be accomplished via solvation in aromatic and aliphatic hydrocarbon solvents, or combinations thereof. In such cases large amounts of various solvents are typically necessary to decrease the viscosity of the composition to facilitate spreading on the intended surface at ambient temperature. Typically, a standard composition of bitumen and solvent is modified by adding fillers, filbers, elastomers or other additives. When the desired amounts of such fillers, fibers, elastomer and/or other additives have been added to the composition it often must have more solvent added to allow for proper viscosity for pumping and/or application.

Such cutbacks have been used successfully in products for use as sealants, roof coatings and roof patches, mastics including plastic cements and the like. However, while these solvent-based compositions have great long term durability including a high degree of water resistance, the required use of large volumes of solvents results in the release of high levels of volatile organic compounds ("VOCs") when the solvents evaporate as the compositions dries.

Many VOCs are known to be highly toxic and present health dangers. Others harm air quality, contribute to the creation of smog and are suspected to escalate global warming. Due to increasing concern over the effects of VOCs on humans and the environment, the need for compositions having lower levels of VOCs has become a high priority in the fields of sealants, coatings and mastics.

The use of water as the fluid media requires the action of surface active agents (emulsifiers). The mixture of water and bitumen produces a dispersion commonly called an emulsion. Bitumen emulsions consist of two types, those in which the bitumen is dispersed in an external or continuous phase of water, and those in which the water is dispersed in the external phase of bitumen.

The use of emulsions as compared to bitumen cutbacks is becoming increasingly popular as the product of choice for the non-heated applications. This is because of the dangers and hazards of solvent-containing compositions to the environment and hazards with employee exposure to solvents in manufacturing and application as discussed above. Storage stability, freeze thaw stability, limited compatibility with auxiliary additives, and low binder (bitumen solids) contents are deficiencies in current bitumen emulsions which hinder and often restrict their use.

For many years various clays have been used in combination with both petroleum- and coal tar-derived bitumens to form aqueous emulsions. These so-called "colloidal clays" have many of the chemical and physical properties necessary to create and provide the emulsion the consistency and stability desired. However, colloidal clay emulsions have a tendency to phase-separate: the bitumen and clay particles (when in the discontinuous phase) settle over time, becoming a dense mass. Reblending into a homogeneous colloidal emulsion is often difficult and time-consuming. Phase-separation is especially troublesome and costly when extensive reblending is required just prior to application. The consequences of applying a phase-separated emulsion are even more undesirable and include: inadequate coverage rates, disabled spray equipment, non-uniform curing rates, varying cured-coating performance properties, and discolored and unsightly coating appearances, to mention but a few.

In order to reduce phase separation, manufacturers have attempted to achieve sufficient dispersion by extensive mixing of the water and colloidal clay slurry, typically for over 8 hours and often for much longer. However, such extensive mixing has still not led to a sufficiently stable bitumen emulsion mainly because full hydrolysis has not been obtained.

Concern over phase separation and the problems associated with it fostered the use of water-soluble gums, including cellulose ethers, which retard phase separation by absorbing water from the aqueous phase and increasing emulsion viscosity. While this approach is relatively inexpensive and alleviates many of the aforementioned concerns, it has associated with it a number of significant problems and deficiencies. Most are related to inadequate emulsion performance and phase-separation.

Another significant problem with the use of water-soluble gums is the required addition of biocides. Cellulose thickeners are, for the most part, vegetable matter. For example, cellulose gums are derived from various sources, including wood pulp and cotton. These materials support fungal and bacterial life, the bi-products of which are weakly acidic and may later "sour" the emulsion causing phase separation. As a preventative measure, synthetic biocides must be added during emulsion formulation and represent an extra production cost.

In summary, a considerable number of drawbacks and problems exist in the art relating to bituminous emulsions and bituminous cutbacks. There is a need for an improved bitumen composition for safe application with reduced VOCs. The applicants have consequently set out to obtain bitumen cutback emulsions which retain stability, avoid flocculation, and achieve the desired characteristics for application while avoiding complex or expensive formulations.

OBJECTS OF THE INVENTION

A primary object of the present invention to provide bitumen cutback emulsions for use as sealants, coatings and/or mastics which may be easily and efficiently manufactured and applied.

Another object of the invention is to proved a cold application emulsion which is of durable and reliable construction.

Another object of the invention is to provide a low cost method of manufacturing a cold application bitumen cutback emulsion.

Another object of the invention is to reduce settling and storage separation in cold application emulsions of sealants, coatings and/or mastics.

Yet another object of the invention is to allow for precise viscosity control in a cold application emulsion.

Another object of the invention is to provide an emulsion for cold application of sealants, coatings and/or mastics which has substantially reduced levels of VOCs.

Another object of the invention is to provide a composition for cold application of sealants, coatings and/or mastics which provides for increased spreadability, greater control of spread rates, and more uniform film thickness.

Another object of the invention is to provide a composition which has a reduced flammability hazard.

Still another object of the invention is to provide a composition for cold application of sealants, coatings and/or mastics which has reduced film stresses and tensions when dried.

Another object of the invention is to provide an emulsion for cold application of sealants, coatings and/or mastics which results in increased abrasion and track resistance.

Another object of the invention is to provide a method of producing an effective composition for the cold application of sealants, coatings and/or mastics which has reduced VOC levels through the use of bentonite.

Still another object of the invention is to provide a stable emulsion of a slurry of substantially fully hydrated colloidal clay and water in a bitumen cutback.

Still another object of the invention is to provide a method of quickly producing a slurry of substantially fully hydrated colloidal clay and water for emulsion in a bitumen cutback.

These and other objects of the invention will be apparent from the disclosure and discussion herein.

SUMMARY OF THE INVENTION

This invention is an emulsion of a colloidal clay and water slurry in a cutback. The invention represents a significant advance over the state of the art by providing novel elements to provide increased stability and performance characteristics.

In accordance with the invention, an improved emulsion adapted for cold application of sealants, coatings and/or mastics is provided. The emulsion includes a reduced number of VOCs compared to typical cold application emulsions. More specifically, the emulsion provides for adequate use in cold applications through the use of colloidal clay, preferably treated bentonite, which preferably comprises between about 0.5–25 weight % of the emulsion ("wt. %"). The emulsion comprises a cutback in addition to the clay and water slurry, preferably a bitumen cutback.

A preferred embodiment of the emulsion includes between about 0.5–25 wt. % bentonite, between about 20–95 wt. % bitumen cutback, and between about 3–55 wt. % water. In certain embodiments, the emulsion may further include an additive comprising between about 0.2–1 wt. % of the emulsion, a non-asbestos fiber comprising between about 0–10 wt. % of the emulsion, a filler comprising between about 3–15 wt. % of the emulsion, and an elastomer comprising between about 0–8 wt. % of the emulsion since the slurry provides for excellent mixing with such additional components.

The inventive method of preparing a low-VOC cold-application emulsion for coatings comprises providing a cutback; providing a slurry of water and colloidal clay; adding fibers and/or fillers to the cutback; mixing the slurry with the cutback such that the resulting emulsion has desired characteristics such as an appropriate viscosity for pumping and/or application, color, spreadability, controlled spread rates, uniform film thickness and track resistance. The preferred method may further comprise creating the slurry by mixing the water and colloidal clay in a high-speed disperser which preferably operates between about 1500–5000 rpms, and most preferably operates at about 3000 rpms. Such mixing preferably continues until the colloidal clay is substantially fully hydrated, i.e., the clay can absorb substantially no more water. In a preferred method, the clay is substantially fully hydrated in a short period of time such as less than 30 minutes, and more preferably in about 10 to 15 minutes.

As stated above, the preferred colloidal clay is bentonite, most preferably treated bentonite. Treated bentonite meets the American Petroleum Institute's requirements of having a Viscometer Dial Reading of 30 or more at 600 rpm; a Yield Point/Plastic Viscosity Ratio of 3 or more; a Filtrate Volume of 15.0 cubic cm or less; a Residue greater than 75 micrometers of 4.0 wt. % or less; and a Moisture of 10.0 wt. % or less. Such treated bentonite must yield approximately 120 to 280 barrels of 15 centipoises mud per ton, and preferably about 180 to 240 barrels per ton. Standard testing procedures for such properties can be found at the API's Specification 13A. The slurry preferably comprises about 1–15% bentonite by weight, more preferably the slurry comprises about 8–12% bentonite by weight.

The cutback preferably comprises about 50–90% bitumen and about 10–50% solvent. More preferably, the cutback comprises about 60–80% bitumen and about 20–40% solvent. Most preferably, the cutback comprises about 70% bitumen and about 30% solvent. In some embodiments, the cutback comprises a resin rather than a bitumen or a resin in addition to a bitumen. The preferred solvent is a mineral spirit/Stoddard solvent.

The emulsion is preferably of the water-in-oil type such that the phase of water is discontinuous and the cutback phase is continuous. Such an emulsion allows for the cutback to "bite" into surfaces upon application, i.e., the emulsion has good adhesiveness such that it can adhere to asphalt shingles, galvanized steel and other difficult surfaces. In the emulsion, the water is preferably substantially de-ionized, although various levels of ions in the water may be desired in order to provide a specific formulation. The emulsion is preferably 0.5–11% colloidal clay and 20–95% cutback by weight. In more preferred embodiments, the emulsion is less than 15% solvent by weight.

Such a reduction is significant over typical prior art compositions. For instance, in the past 500 liters of 70/30 cutback may have 300 liters of fiber and/or filler added to provide desired application or endurance characteristics. In order to prepare such a composition for application, another 200 liters of solvent may be necessary to provide the appropriate viscosity. The applicants' invention provides for the same application that 450 liters of 70/30 cutback may be mixed with 450 liters of the preferred slurry and 100 liters of fiber and/or filler. Such an emulsion uses a less than 40% as much solvent as in the prior art (135 liters vs. 350 liters).

The invention is also described as an emulsion for use as a low-VOC cold-application coating formed by a cutback and a slurry of bentonite and water. In such an emulsion, the bentonite is preferably substantially fully hydrated. The bentonite preferably meets the requirements of API specification 13A as discussed above. The emulsion may further comprise additives, non-asbestos fiber, fillers and/or an elastomer. Such components can be used to control specific characteristics of the emulsion such as color, spreadability, flexibility, etc.

As a low-VOC emulsion, the emulsion is comprised of preferably less than about 30% solvent by weight, more preferably less than about 20% solvent by weight and most preferably less than about 15% solvent by weight. In certain embodiments the emulsion comprises about 45% cutback, 45% slurry and 10% fiber and/or filler.

In certain preferred embodiments, the bitumen is asphalt or coal tar and is preferably a high melt bitumen, i.e., it has a melting point of at least about 160° F. In certain other preferred embodiments, the bitumen has a melting point of at least about 180° F. or of at least about 200° F.

DETAILED DESCRIPTION OF PREFERRED EMBODIMENTS

Bentonite is a colloidal clay mineral found throughout the world in deposits of volcanic origin. Chemically, bentonite clay is in the smectite group of colloidal clays which also includes hectorite, saponite and beidellite. Each of these materials exists as three layers which are typically 0.2 to 2.0 microns in diameter and 6 to 10 Angstroms in thickness. The layers may be separated by interlayer galleries containing cations and water. When exposed to water, the clay surface and interlayer cations hydrate and the interlayer spacing increases in a series of steps and may eventually exfoliitate to form a suspension of individual platelets.

Bitumens such as asphalt and coal tar are manufactured by a variety of methods producing types and grades of different specifications. The properties range from soft and flowable to hard and brittle. Bitumen has uses in coating, sealing, and adhesive applications in construction and industrial applications. It is thermoplastic in nature, that is, it needs to be heated above their melting point in order to be applied without a liquid vehicle.

Asphalt is a bitumen derived from a number of materials such as, for example, petroleum, gilsonite, shale oil, coal tar and the like. It is typically a viscous black mixture of compounds of parafinnic, cycloaliphatic and aromatic compounds. It may also contain sulfur, nitrogen and oxygen. While asphalt can be obtained from natural sources it is primarily derived as the residue of petroleum distillation (e.g. the bottom product of a vacuum distillation of a topped crude). Although not limited, preferred grades have a penetration value of (ASTM D5) of no more than 300 dmm, preferably 50 to 200 dmm, and conform in general to ASTM D312, D946 or D449.

Coal tar is a bitumen derived from crude coal tar, water gas tar, oil gas tar or from a combination of such tars with their constituents. Coal tar is black, viscous, with naphthalene-like odor, amorphous residue resulting mainly from the distillation of coal. The majority of its composition is polynuclear aromatic compounds such as aromatic hydrocarbon, naphthalenic, phenolic, anthracenic, quinolinic compounds with traces of insoluble materials. Different grades have different float tests and softening points. Although this invention is not constrained to such limitations, the preferred coal tars have a float test at 122° F. ranging from about 75–230 seconds, and more preferably from about 180–220 seconds, and conform in general to the specification outlined by RT-10 (Road tar-10), RT-11 and RT-12 in ASTM D490. The coal tar can be utilized in the form of an aqueous emulsion readily available in the trade (see Federal Specification RP355e) and thus has a maximum water content of about 53 wt. %.

Bitumen cutback is a mixture of bitumen and hydrocarbon solvent. Hydrocarbon solvents include kerosene, fuel oils, jet fuel, mineral spirit/Stoddard, naphtha, high flash aromatic, low flash aromatic, xylene, toluene, and other petroleum solvent products. For certain embodiments of this invention, the preferred cutback is a mixture of asphalt bitumen and mineral spirit/Stoddard solvent.

Surprisingly, it has been found that certain high efficiency, low sodium bentonites, when dispersed under high-speed mixers in the presence of certain additives can become substantially fully hydrated and form water-based slurries that may be blended with solvent-based asphalt cutback to form stable emulsions for use as cold application sealants, coatings and/or mastics. The bentonite slurry can be used as a replacement for much of the solvents used in typical compositions since it provides for a stable, suitable emulsion viscosity. Therefore, lower levels of VOCs are found in the inventive emulsion, thereby reducing the level of VOC emissions, flammability and the odor of VOCs both when wet and dry.

The use of bentonite improves the emulsion beyond achieving lower VOC levels. First, it provides the emulsion with thixotropic viscosity in which the emulsion becomes fluid when stirred or shaken and returns to the semisolid state upon standing. Such behavior greatly reduces settling and storage separation between the slurry and cutback which allows for little or no stirring before use since the components need not be mixed back together.

Second, the presence of bentonite in the emulsion facilitates ease of formulation since various fibers, fillers and resins, among other additives, can be compounded in the emulsion for precise and stable viscosity control. Furthermore, such emulsions are not subject to bacteria degradation. Such characteristics result in emulsions which are equal to or even superior to asbestos-containing products without having the drawbacks associated with asbestos.

In addition, such bentonite-including emulsions have superior application characteristics including longer open time, greater ease when spreading the emulsion, greater control of spread rates, more uniform film application thicknesses and applicability on damp surfaces.

The inventive emulsion also has reduced film stresses and tensions when dried, meaning that the compound is less prone to cracks and, ultimately, failure. The more durable surface translates into superior abrasion resistance, superior track resistance, resistance to softening when warmed and superior solvent resistance.

Lastly, the emulsion including bentonite is less costly to produce than current products.

A preferred process of producing water reducible bituminous sealants, coatings and/or mastics and in accordance with the invention is as follows:

1. Treated bentonite clay is added into clean water in a high-speed mixing agitator such that the mixture comprises about 4–12% bentonite (more preferably 8–12%). During mixing, the clay is dispersed or high sheared in a colloid mill until it turns into a clay slurry. The viscosity of the clay slurry is preferably between about 20,000–180,000 centiposes (CPS) at 77° F.

2. Cutback consisting of between about 50–90% bitumen and between about 10–50% mineral spirit Stoddard solvent is provided and is mixed with a selected amount of the slurry to form a soluble system.

3. An additive is added to the cutback to enhance the stability of the soluble system.

4. Non-asbestos fiber is added to reinforce the soluble system sealant/coating/mastic film strength. It also provides additional viscosity and texture. Such fibers may include cellulosic paper, fiberglass, mineral fiber, or polymer fiber including polypropylene and polyethylene.

5. Non-reactive fibers commonly called pigment extenders, e.g., natural or calcined clay, mica and silica powder, slate powder, coal ash, fly ash, etc., are added to the system to improve film strength and consistency.

6. Elastomers, which may include SBR, SBS, SIBS, acrylic, styrene, neoprene, polyvinyl, etc., are added to impart buffering as well as tensile strength to the emulsion.

7. If necessary, another selected amount of slurry may be mixed with the system to further control the desired characteristics for application without adding additional solvents.

EXAMPLE 1

The Preparation of a Bituminous Mastic

| Treated bentonite clay slurry | 3–60 wt. % |
|---|---|
| Asphalt cutback | 20–95 wt. % |
| Fibers | 2–10 wt. % |
| Fillers | 3–15 wt. % |
| Additives | 0.2–1.0 wt. % |
| | 100% |

This emulsion is designed for use in patching repair, roof flashing repairs and installation.

EXAMPLE 2

The Preparation of Bituminous Sealants

| Treated bentonite clay slurry | 3–60 wt. % |
|---|---|
| Asphalt cutback | 20–95 wt. % |
| Fibers | 2–6 wt. % |
| Fillers | 3–10 wt. % |
| Additives | 0.2–1.0 wt. % |
| | 100% |

This emulsion is designed for recoating by brush application on foundation walls, roof, metal, wood, concrete and other building materials.

EXAMPLE 3

The Preparation of a Bituminous Non-fiber Sealants

| Treated bentonite clay slurry | 3–60 wt. % |
|---|---|
| Asphalt cutback | 20–95 wt. % |
| Fillers | 3–10 wt. % |
| Additives | 0.2–1.0 wt. % |
| | 100% |

This emulsion is designed for similar uses to Example 2, except for spray application.

EXAMPLE 4

The Preparation of an Elastomeric Bituminous Mastic

| Treated bentonite clay slurry | 3–60 wt. % |
|---|---|
| Asphalt cutback | 20–95 wt. % |
| Fibers | 2–10 wt. % |
| Fillers | 3–15 wt. % |
| Additives | 0.2–1.0 wt. % |
| Elastomers (Elastomeric polymers) | 0.5–5 wt. % |
| | 100% |

This emulsion is designed for use in roofing and foundation applications.

EXAMPLE 5

The Preparation of an Elastomeric Bituminous Sealant

| Treated bentonite clay slurry | 3–60 wt. % |
|---|---|
| Asphalt cutback | 20–95 wt. % |
| Fibers | 2–6 wt. % |
| Fillers | 3–10 wt. % |

-continued

| | |
|---|---|
| Additives | 0.2–1.0 wt. % |
| Elastomers | 0.5–3 wt. % |
| | 100% |

EXAMPLE 6
The Preparation of an Elastomeric Non-fiber Sealant

| | |
|---|---|
| Treated bentonite clay slurry | 3–60 wt. % |
| Asphalt cutback | 20–95 wt. % |
| Fillers | 3–10 wt. % |
| Additives | 0.2–1.0 wt. % |
| Elastomers | 0.5–6 wt. % |
| | 100% |

According to Examples 1–6, the ranges and descriptions of the emulsion components are about:

| | |
|---|---|
| Bentonite | 0.5–11 wt. % |
| Water | 3–55 wt. % |
| Asphalt cutback | 20–95 wt. % |
| Additives | 0.2–1 wt. % |
| Non-asbestos fiber | 0–10 wt. % |
| Filler | 3–15 wt. % |
| Elastomer | 0–8 wt. % |

Although the previous examples are offered, it is understood that the disclosure of the preferred form does not limit the intent of the invention and changes can occur without departing from the spirit and scope of the invention. For instance, selected bentonites can be used in higher concentrations. Various modes of carrying out the invention are contemplated as being within the scope of the following claims which particularly point out and distinctly claim the subject matter regarded as the invention.

The claimed invention is:

1. A method of preparing a low-VOC cold-application emulsion for coatings, the method comprising:
   providing a cutback;
   providing a slurry of water and colloidal clay;
   adding fibers and/or fillers to the cutback;
   mixing the slurry with the cutback to create the emulsion.

2. The method of claim 1 wherein the slurry is created by mixing the water and colloidal clay in a disperser.

3. The method of claim 2 wherein the disperser operates at between about 1500–5000 rpms.

4. The method of claim 3 wherein the water and colloidal clay are mixed until the colloidal clay is substantially fully hydrated.

5. The method of claim 4 wherein the clay is substantially fully hydrated in less than 30 minutes.

6. The method of claim 5 wherein the clay is substantially fully hydrated in about 10 to 15 minutes.

7. The method of claim 1 wherein the colloidal clay is treated bentonite.

8. The method of claim 7 wherein the slurry is about 1–15% bentonite by weight.

9. The method of claim 1 wherein the cutback comprises about 50–90% bitumen and about 10–50% solvent.

10. The method of claim 9 wherein the cutback comprises about 70% bitumen and about 30% solvent.

11. The method of claim 1 wherein the cutback comprises a resin and a solvent.

12. The method of claim 1 wherein the emulsion is of the water-in-oil type.

13. The method of claim 1 wherein the emulsion is 0.5–11% colloidal clay and 20–95% cutback by weight.

14. The method of claim 1 wherein the emulsion is less than 15% solvent by weight.

15. An emulsion for use as a low-VOC cold-application coating, the emulsion formed by a cutback and a slurry of bentonite and water and comprising about 45% cutback, 45% slurry and 10% fiber and/or filler.

16. The emulsion of claim 15 wherein the bentonite is substantially fully hydrated.

17. The emulsion of claim 15 wherein the emulsion comprises less than about 20% solvent by weight.

18. The emulsion of claim 15 wherein the slurry comprises between about 1–15% bentonite by weight.

19. The emulsion of claim 15 wherein the fiber and/or filler includes additives, non-asbestos fiber, fillers and/or an elastomer.

* * * * *